(12) United States Patent
Meggiolan et al.

(10) Patent No.: US 10,557,510 B2
(45) Date of Patent: Feb. 11, 2020

(54) BRAKE DISC FOR A BICYCLE

(71) Applicant: Campagnolo S.r.l., Vicenza (IT)

(72) Inventors: Mario Meggiolan, Creazzo (IT); Davide Zenere, Vicenza (IT); Filippo Bove, Padua (IT)

(73) Assignee: Campagnolo S.r.l., Vicenza (IT)

( * ) Notice: Subject to any disclaimer, the term of this patent is extended or adjusted under 35 U.S.C. 154(b) by 96 days.

(21) Appl. No.: 15/889,835

(22) Filed: Feb. 6, 2018

(65) Prior Publication Data

US 2018/0223931 A1    Aug. 9, 2018

(30) Foreign Application Priority Data

Feb. 9, 2017    (IT) ...................... 102017000013990

(51) Int. Cl.
*F16D 65/12*     (2006.01)
*B62L 1/00*      (2006.01)
*F16D 65/02*     (2006.01)

(52) U.S. Cl.
CPC ............ *F16D 65/123* (2013.01); *B62L 1/005* (2013.01); *F16D 2065/1316* (2013.01); *F16D 2065/1332* (2013.01); *F16D 2065/1348* (2013.01); *F16D 2065/1384* (2013.01)

(58) Field of Classification Search
CPC ........... F16D 65/123; F16D 2065/1316; F16D 2065/1332; F16D 2065/1348; F16D 2065/1356; F16D 2065/1376; F16D 2065/1384; F16D 2065/1392
See application file for complete search history.

(56) References Cited

U.S. PATENT DOCUMENTS

| 5,980,407 A | 11/1999 | Takamori et al. |
| D721,309 S * | 1/2015 | Moore ........................ D12/180 |
| 2007/0144836 A1 | 6/2007 | Kunstle et al. |
| 2013/0240309 A1 | 9/2013 | Moore |

(Continued)

FOREIGN PATENT DOCUMENTS

| EP | 1932753 A2 | 6/2008 |
| WO | 2008055608 A1 | 5/2008 |

OTHER PUBLICATIONS

Italian Search Report and Written Opinion in Italian Application No. 102017000013990, dated Sep. 29, 2017, with English translation.

*Primary Examiner* — Melanie Torres Williams
(74) *Attorney, Agent, or Firm* — Volpe and Koenig, P.C.

(57) ABSTRACT

A bicycle brake disc having a braking track with brake pads and a plurality of first connection portions that extend towards the inside and that comprise respective first connection areas; a second component having (i) a radially inner annular coupling portion for coupling with a hub of a wheel of the bicycle and (ii) a plurality of second connection portions. The second connection portions extending outwards from the radially inner annular coupling portion towards the first component and comprising respective second connection areas; connecting members active between the first connection areas and the corresponding second connection areas. The second connection portions comprise at least one respective pair of arms that extend between the respective second connection area and the radially inner annular coupling portion, the pair of arms defining a through opening between them.

19 Claims, 9 Drawing Sheets

(56) References Cited

U.S. PATENT DOCUMENTS

2014/0097051 A1     4/2014   Moore
2015/0360744 A1   12/2015   Noborio et al.
2016/0160947 A1*   6/2016   Wen ........................ F16D 65/12
                                                                                 188/218 XL

* cited by examiner

BRAKE DISC FOR A BICYCLE

CROSS REFERENCE TO RELATED APPLICATION

This application claims the benefit of Italian Application No. 102017000013990, filed on Feb. 9, 2017, which is incorporated herein by reference as if fully set forth.

FIELD OF INVENTION

The present invention relates to a brake disc for a bicycle.

BACKGROUND

In particular, the brake disc is configured to be mounted on a hub of a wheel of the bicycle.

Preferably, said bicycle is a racing bicycle.

As known, it is now common in bicycles to use disc brakes. Such brakes are indeed often preferred to conventional brakes of a different type in that they ensure a high braking force and better modularity that allows a marked braking sensitivity, as well as being less subject to problems caused by mud or water.

Typically, a disc brake comprises a caliper fixed onto the frame of the bicycle and a brake disc mounted on the hub of the wheel. Inside the caliper there are two or four opposite brake pads. The brake disc rotates inside the space defined between the opposite pads. By actuating the brake lever, the pads are brought towards the brake disc, generating friction on the brake disc and, consequently, braking the wheel.

The brake disc comprises a braking track configured to cooperate with pads and a radially inner annular coupling portion for coupling with the hub.

The brake disc can be made in a single piece or in two components.

In this last case, the brake disc comprises a first component having the braking track and a second component having the radially inner annular coupling portion for coupling with the hub.

The first component is typically made of a first material that ensures good braking properties, like for example steel, whereas the second component is typically made of a second lighter material, like for example aluminum or light alloys.

The second component has a plurality of radially outer connection portions for connecting to the first component at a respective plurality of radially inner connection portions of the first component.

In the technical field, the second component is called "spider" or "carrier", whereas the first component is called "rotor" or is simply indicated with the expression "braking track".

The connection between the radially outer connection portions of the second component and the radially inner connection portions of the first component can be carried out so that the first component and the second component are substantially coplanar but not in direct contact, to avoid the occurrence of mechanical tensions in the radial direction due to different heat expansion coefficients of the two materials of the first and the second component. The two components of the brake disc are joined together by rivets or similar which also keep the rotor and the spider coplanar and slightly spaced apart in the radial direction. The brake disc with this type of coupling, known as floating rotor brake disc, has the drawback of having potential twisting, since the planarity of the brake disc is, basically, entrusted only to the rivers.

Alternatively, the two components of the brake disc are coupled together so that regions between portions of the rotor and portions of the spider overlap, making a so-called "non floating rotor". Also in this case, rivets or similar stably join the two components of the brake disc, but the structural continuity of the entire brake disc is also ensured by the overlapping region between rotor and spider.

As far as the coupling with the hub is concerned, the radially inner annular portion of the brake disc is provided with a grooved radially inner surface (in other words a radially inner surface that extends longitudinally and is provided with longitudinal grooves), which is mounted on a matching grooved radially outer surface (in other words a radially outer surface that extends longitudinally and is provided with longitudinal grooves matching those of the radially inner surface) of a portion of the hub, as disclosed in patent application EP 1932753 to the same Applicant.

EP 1932753 also discloses a lock nut, which is screwed onto the hub until it abuts axially on the radially inner annular portion of the brake disc, so as to define a stable axial position of the brake disc on the hub.

The radially outer connection portions of the second component typically consist of a plurality of arms arranged equally circumferentially spaced and extending from the radially inner annular coupling portion. Such arms can have a substantially radial arrangement or, preferably, are inclined with respect to the radial direction, typically with the same inclination for every arm. The number of arms is variable: for example brake discs with five or six arms are well known.

The aforementioned arms are typically made in one piece with the radially inner annular coupling portion.

The braking force exerted by the pads of the brake on the braking track is transmitted to the radially inner annular coupling portion of the brake disc and discharged on the hub of the wheel. Therefore, the braking force exerted by the pads of the brake creates a torque at the radially inner annular coupling portion of the brake disc that is compensated by a pair of resistant forces of equal intensity and opposite direction at the coupling between brake disc and hub of the wheel.

The Applicant has observed that at the connection between arm and radially inner annular coupling portion there are areas with high concentration of stresses, since in these areas the distance from the pad of the brake is substantially maximum and, therefore, the torque transmitted is also maximum. For this reason, as stated above, the cited arms are preferably inclined with respect to the perfectly radial direction, to try to decrease the component of the braking force perpendicular to the arm itself (and therefore the torque transferred to the radially inner annular coupling portion).

The Applicant has however noted that the inclination of the arms with respect to the radial direction cannot be increased beyond a certain limit, since the arms must effectively reach the radially inner annular coupling portion.

The Applicant has also noted that increasing the inclination of the arms and, at the same time, ensuring that they effectively reach the radially inner annular coupling portion means an increase in the size of the arms, with consequent increase in the weight of the brake disc.

The Applicant has perceived that it would be advantageous to ensure an effective and safe transmission of forces between braking track and radially inner annular coupling portion, at the same time keeping down the weight of the brake disc.

SUMMARY

In the present description and in the following claims, the terms "axial", "axially", "longitudinal", "longitudinally" and the like are meant to refer to a direction substantially coinciding with or substantially parallel to a rotation axis of the brake disc, which substantially coincides with a longitudinal axis of the hub, whereas the terms "radial", "radially" and similar are meant to refer to a direction that lies in a plane substantially orthogonal to the rotation axis of the brake disc and that passes through such a rotation axis.

The present invention therefore relates to a brake disc for a bicycle comprising:

a first component having a braking track configured to cooperate with brake pads and a plurality of first connection portions that extend towards the inside and that comprise respective first connection areas;

a second component having (i) a radially inner annular coupling portion for coupling with a hub of a wheel of the bicycle and (ii) a plurality of second connection portions, in a number corresponding to said plurality of said first connection portions, the second connection portions extending outwards from the radially inner annular coupling portion towards said first component and comprising respective second connection areas;

connecting members active between the first connection areas and the corresponding second connection areas;

characterized in that said second connection portions comprise at least one respective pair of arms that extend between the respective second connection area and the radially inner annular coupling portion, said pair of arms defining a through opening between them.

The Applicant has perceived that, by connecting the second connection area and the radially inner annular coupling portion with a pair of arms, it is possible to at the same time ensure both an effective mechanical coupling between the second connection area and the radially inner annular coupling portion, and an effective transmission of loads from the braking track to the radially inner annular coupling portion.

The Applicant has indeed perceived that each arm of the pair of arms can be oriented, in other words can extend, along mutually different directions so that the two arms can cooperate in transferring the loads coming from the braking track.

Moreover, thanks to the provision of the through openings defined between the pairs of arms, it is also ensured that the weight of the brake disc is kept down.

Hereinbelow preferred features of the brake disc for a bicycle according to the present invention are described, which can be provided for individually or in combination.

Preferably, the arms of said pair of arms extend along an arched line.

Such an arched line, predetermined during the design step, defines a concavity for each arm of the pair of arms. In this way, during braking, the compression force that said arms are subjected to tends to accentuate the concavity thereof, ensuring that they always bend in the same direction, avoiding breaking or yielding of the arms.

Preferably, said pair of arms has divergent arrangement from the respective second connection area towards the radially inner annular coupling portion, making divergent arms that extend in different directions.

The two divergent arms, extending in different directions, ensure that the load coming from the braking track is transmitted in points of the radially inner annular coupling portion that are circumferentially distant from one another.

In this way, the load coming from the braking track can be distributed on the radially inner annular coupling portion along a large circular sector, decreasing the possibility of concentration of loads on very limited areas of the radially inner annular coupling portion.

Preferably, each second connection portion comprises a reinforcing arm that extends from the second connection area and reaches another second connection portion that is located circumferentially adjacent to said second connection portion.

Preferably, the reinforcing arm extends along an arched line.

Such an arched line, predetermined during the design step, defines a concavity for the reinforcing arm. In this way, during braking, the compression force that the reinforcing arm is subjected to tends to accentuate the concavity thereof, ensuring that it always bends in the same direction, avoiding breaking or yielding of the reinforcing arm.

Advantageously, the reinforcing arms ensure a more balanced distribution of the loads on the radially inner annular coupling portion.

In particular, each reinforcing arm extends from the second connection area and reaches an arm of the pair of arms, of the circumferentially successive second connection portion, at or close to a radially outer end thereof.

Such a configuration allows the creation of air vortices such as to allow a rapid dissipation of heat especially in the connection areas.

Furthermore, by extending and connecting the reinforcing arm in radially inner position with respect to the second connection area, the compression forces that passes through the reinforcing arm is allowed to be discharged far from the pivot of the connection between the first and the second component of the disc brake.

Preferably, each first connection portion comprises a radially outer end joined to the braking track and a radially inner end at the respective first connection area. More preferably, said first connection portion extends in an inclined direction with respect to a radial direction passing through the center of the radially inner annular coupling portion and through said radially inner end.

Advantageously, such an inclined direction with respect to the radial direction makes it possible to distribute the loads in a balanced manner so that the first connection portion works substantially with a compression stress and so that a radially opposite first connection portion works substantially with a traction force.

Preferably, each reinforcing arm of a second connection portion has an arrangement substantially parallel to that of the first connection portion of said first component with which the second connection portion of the second component is associated.

Advantageously, the reinforcing arm—with arrangement substantially parallel to that of the first connection portion— also works substantially with a compression stress.

Preferably, said through opening has rounded edges at joining areas of each arm of the pair of arms with the respective second connection area and with the radially inner annular coupling portion.

More preferably, said rounded edges have radii of curvature comprised in the range between 1 mm and 6 mm, including extreme values, preferably in the range between 2 mm and 4 mm, including extreme values, and more preferably in the range between 2.5 mm and 3 mm, including extreme values.

Advantageously, the rounded edges prevent the creation of areas of concentration of the stresses between the arms and the second connection area and between the arms and the radially inner annular coupling portion.

Preferably, each arm of the pair of arms has the same axial thickness.

More preferably, said reinforcing arm has smaller axial thickness than that of the arms of the pair of arms.

Advantageously, the arms of the pairs of arms and the reinforcing arms lie on two different planes. The middle plane of the arms of the pairs of arms lies between two planes of maximum thickness of the second connection portions, whereas the middle plane of the reinforcing arms lies on a plane that is located between the aforementioned planes of maximum thickness. This, as well as lightening the structure of the brake disc, creates a discontinuity of the surfaces that advantageously increases the turbulence of the air on the brake disc in operation and thus the dissipation of heat.

The connection between the second connection portions of the second component and the corresponding first connection portions of the first component takes place through the cited connecting members.

Preferably, such connecting members comprise axially perforated rivets received in respective through holes defined in the first and second connection area.

Advantageously, the use of perforated rivets ensures better damping of the vibrations with the effect of obtaining braking that is less noisy.

Preferably, said connecting members are equally spaced apart by a distance L comprised in the range between 10 mm and 80 mm, including extreme values, preferably in the range between 20 mm and 50 mm, including extreme values, and more preferably in the range between 35 mm and 40 mm, including extreme values.

Advantageously, the Applicant has found that with the distance L comprised in the aforementioned ranges the vibrations of the brake disc during braking are kept down, as is the relative noise produced.

The Applicant has also found that the preferred values of the aforementioned distance L between the connecting members are substantially unchanged irrespective of the outer diameter of the brake disc. For this reason, the number of connecting members, i.e. the number of first and second connection portions, increases as the outer diameter of the brake disc increases. For example, the Applicant has found that for a brake disc with outer diameter equal to 140 mm it is advantageous to have 6 connecting members (i.e. 6 first and second connection portions) and that for a brake disc with outer diameter equal to 160 mm it is advantageous to have 7 connecting members (i.e. 7 first and second connection portions).

Preferably, said first connection area axially overlaps the corresponding second connection area.

More preferably, said first connection area is housed in a recess of the second connection area.

Even more preferably, said first connection area is not radially in contact with the second connection area.

Advantageously, in this way the recess of the second connection area can be made without the need for strict dimensional tolerances. In the case in which the first and second component are made of different materials (for example steel and aluminum, respectively), the different thermal dilations of the first and second component do not generate radial loads on the recess of the second connection area.

Preferably, said braking track comprises a plurality of through openings, of elongated shape and inclined with respect to a direction of extension of a side edge of said brake pads.

Advantageously, the Applicant has found that—thanks to such an inclination—the noisiness during braking is reduced, since during braking the side edge of the brake pads does not meet the entire through opening at once, but meets it gradually.

Moreover, the Applicant has found that—using the same inclination for all of the through openings—the noisiness is constant during braking.

Preferably, said through openings have an inclination, with respect to said direction of extension of said side edge of said brake pads, comprised in the range between 5° and 60° mm, including extreme values, preferably in the range between 15° and 40° mm, including extreme values, and more preferably said inclination is about 29°.

Advantageously, the Applicant has found that with the inclinations indicated above the noisiness of the brake disc during braking is particularly low.

Preferably, the number of said through openings is a multiple of the number of first connection portions.

Advantageously, the Applicant has found that in this way the noisiness of the brake disc during braking is significantly reduced.

BRIEF DESCRIPTION OF THE DRAWINGS

The features and advantages of the invention will become clearer from the further description of preferred embodiments thereof, made with reference to the attached drawings, where.

DETAILED DESCRIPTION OF THE PREFERRED EMBODIMENTS

Figure 1:
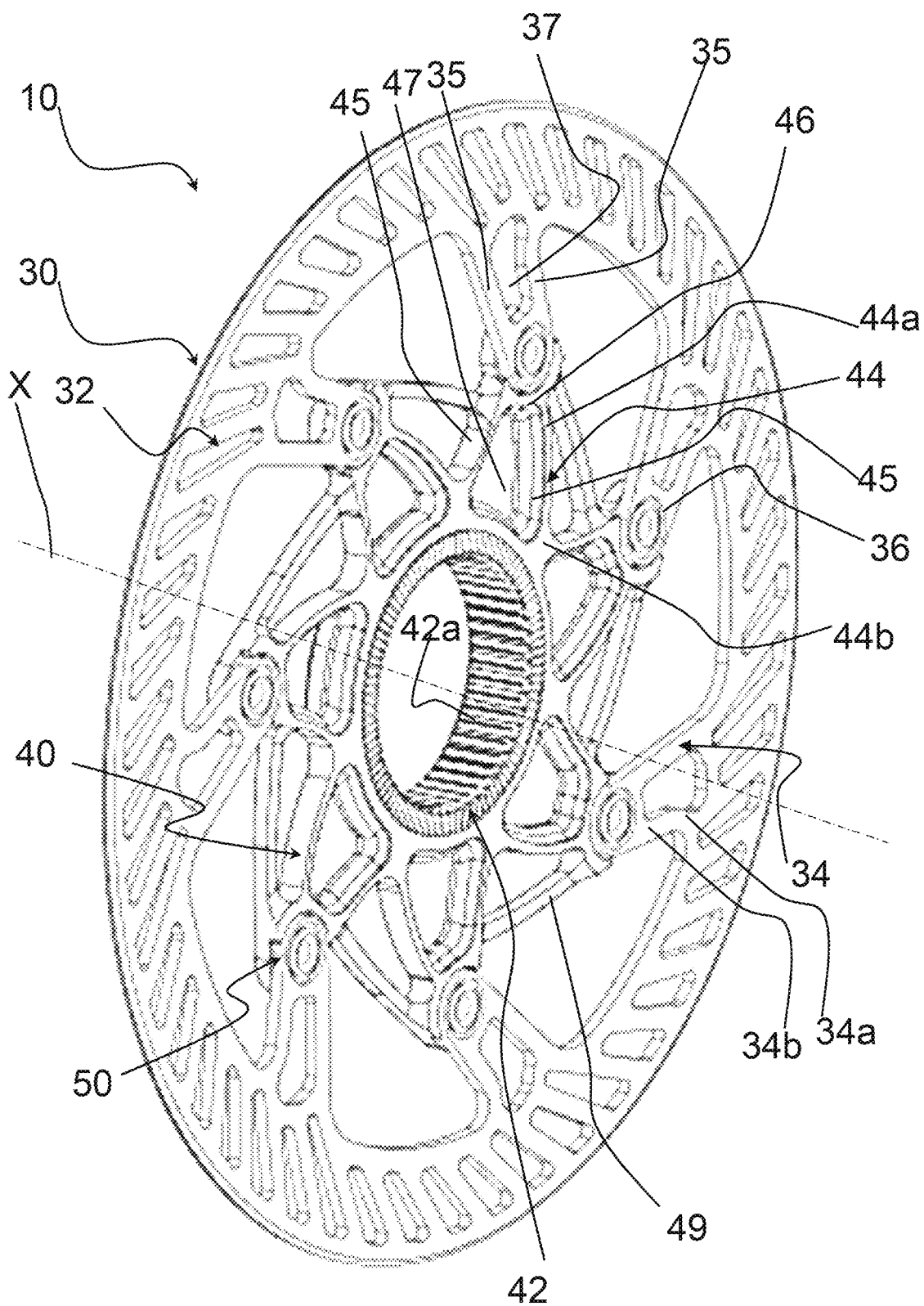
FIG. 1 is a perspective view of a first embodiment of a brake disc for a bicycle according to the present invention.

With initial reference to FIGS. 1-7 and 9, reference numeral 10 wholly indicates a first embodiment of a brake disc for a bicycle according to the present invention.

The brake disc 10 is configured to be mounted on a hub (not illustrated) of a wheel of the bicycle.

The hub is mounted on the frame of the bicycle. In particular, the frame comprises two opposite support arms of the wheel at the respective free end portions of which there are housing seats of opposite free end portions of the hub.

A caliper 12 (FIG. 7) of a disc brake is fixed onto the frame of the bicycle. In particular, the caliper is fixed in a conventional manner to one of the support arms of the wheel.

Figure 6:
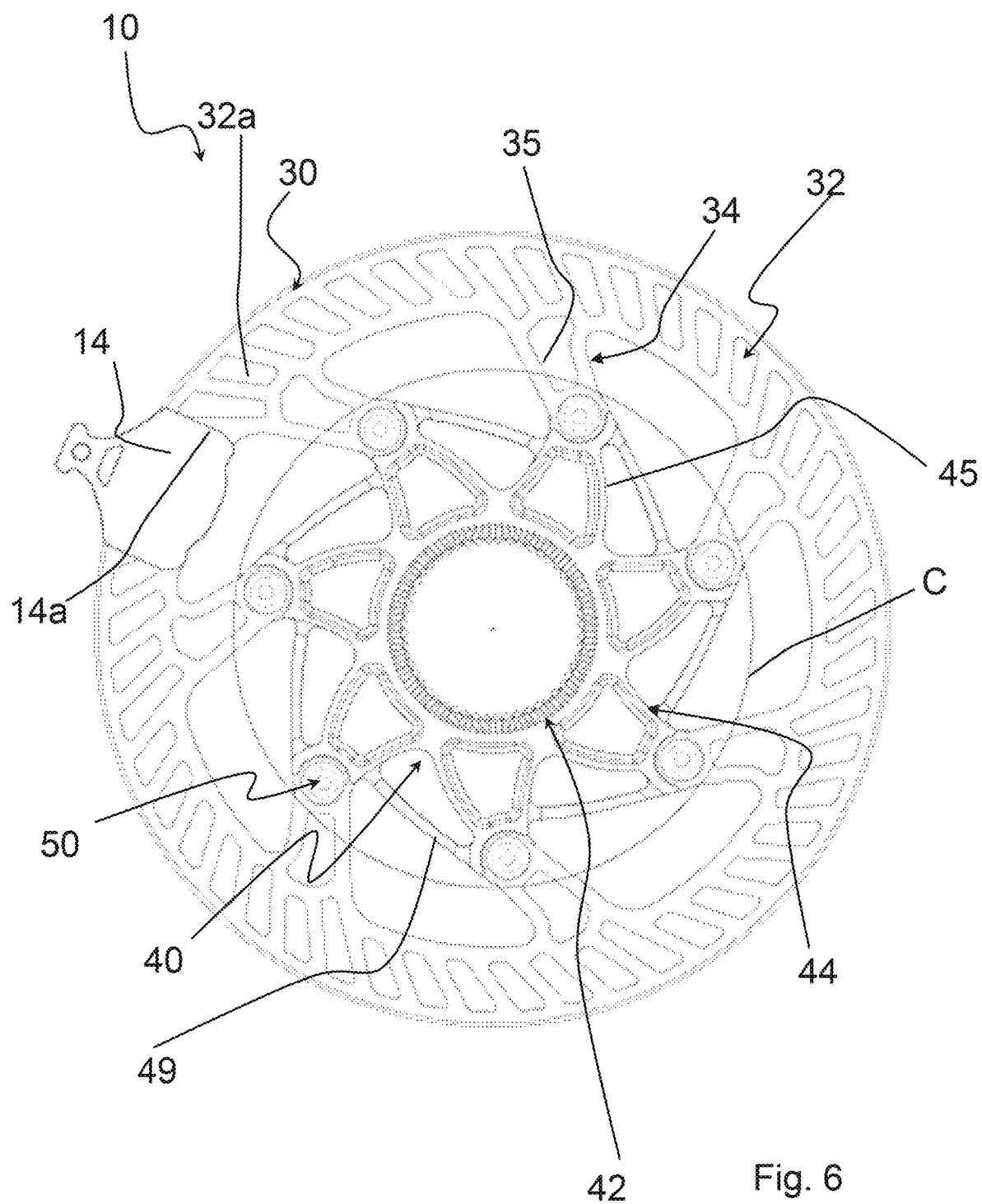
FIG. 6 is a front view of the brake disc of FIG. 1, totally analogous to FIG. 2, in which a brake pad has been added.

Inside the caliper 12 there are at least two opposite brake pads 14 (FIG. 6).

The brake disc 10 rotates inside the space defined between the opposite brake pads 14. By actuating the brake lever (not illustrated), the brake pads 14 are brought towards the brake disc 10, generating friction on the brake disc 10 and, consequently, braking the wheel.

In particular, the hub extends along a longitudinal axis X that coincides with the rotation axis of the bicycle wheel and of the brake disc 10 (FIG. 1).

The hub comprises a disc seat for housing and locking in rotation the brake disc 10, and a shoulder, which provides an abutment position in the axial direction for the brake disc 10 mounted on the disc seat.

The disc seat comprises a grooved radially outer surface, i.e. a radially outer surface that extends longitudinally and is provided with longitudinal grooves.

The brake disc 10 comprises a grooved radially inner surface 42a matching that of the disc seat, i.e. a radially inner surface 42a that extends longitudinally and is provided with longitudinal grooves matching those of the grooved radially outer surface of the disc seat.

More in general, the disc seat is shaped according to a shape coupling profile. This term is meant to indicate that the profile of the disc seat has geometric characteristics such as to allow the transmission of a torsion between the hub (on which the disc seat is formed) and the brake disc 10 mounted on such a disc seat with a matching profile. A shape coupling profile can for example be a polygonal profile, or a circular profile with an alteration (for example, leveled along a cord), or other. In particular, the shape coupling profile of the disc seat illustrated in the non-limiting example of the figures is a grooved profile, with ridges and throats, oriented in a direction parallel to the axis X.

The shoulder is adjacent to an axially inner side of the disc seat.

Adjacent to the opposite axially outer side of the disc seat there is a threaded portion, formed at a free end portion of the hub, for coupling with a lock nut (not illustrated), which holds the brake disc 10 in the disc seat, against the shoulder.

The brake disc 10 comprises a first component 30 and a second component 40.

The first component 30 comprises a braking track 32 and the second component 40 comprises a radially inner annular portion 42 for coupling with the hub.

Figures 2, 3:
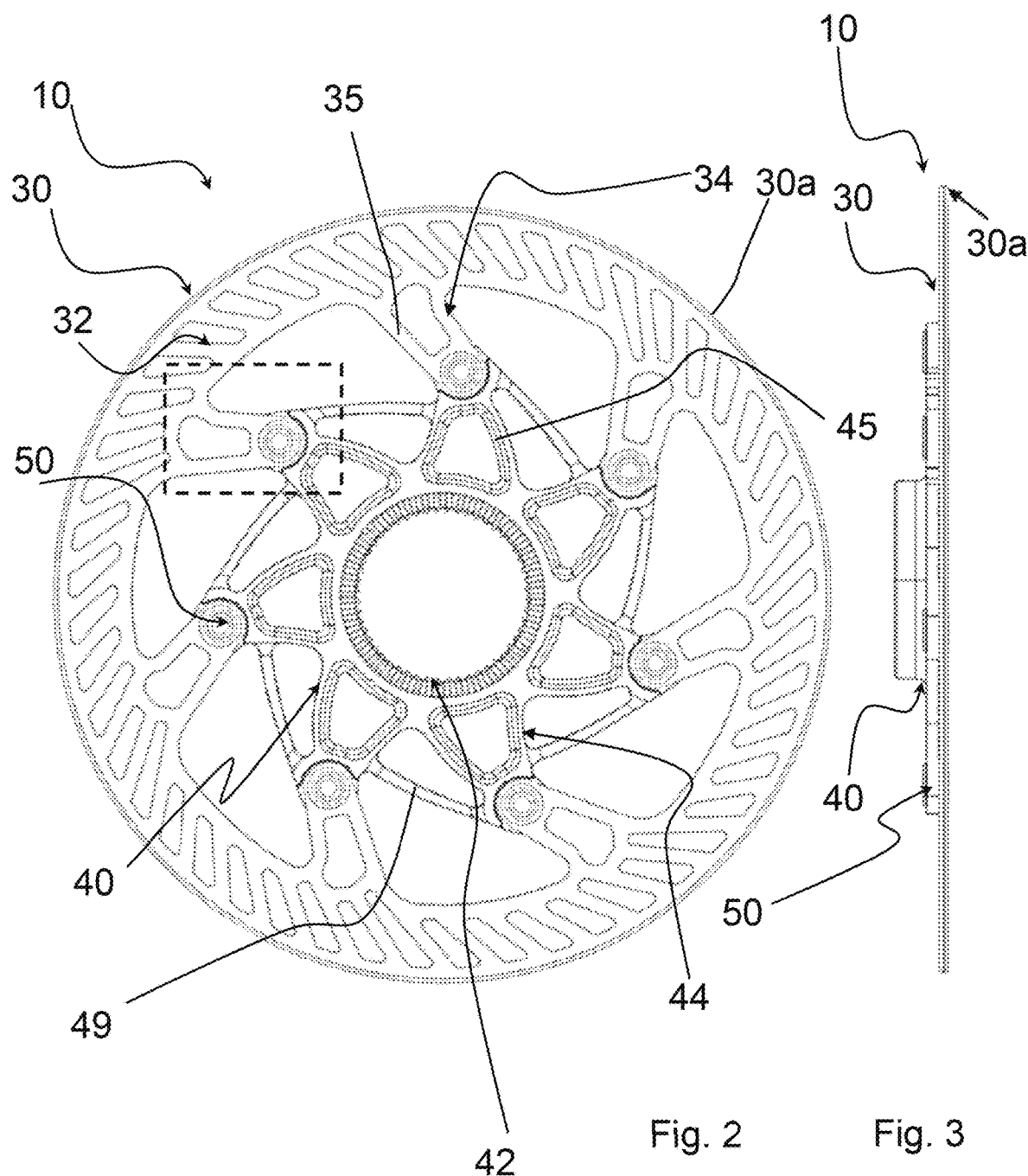
FIG. 2 is a front view of the brake disc of FIG. 1.
FIG. 3 is a side view of the brake disc of FIG. 1.

The braking track 32 is configured to cooperate with the brake pads 14 and has a substantially annular extension, so that the radially outer profile of the first component 30 is substantially circular. In order to make the first component 30 less sharp, the radially outer edge 30a of the first component 30 is rounded, as shown in FIG. 3.

The radially inner annular portion 42 is provided with the grooved radially inner surface 42a described earlier.

The first component 30 is preferably made of a first material that ensures good characteristics of braking and of resistance both to oxidation and to wear, like for example steel, whereas the second component 40 is preferably made of a second lighter material, like for example aluminum or alloys thereof or other light alloys. Aluminum (or alloys thereof) is particularly recommended due to its ability to more easily transfer and dispose of the heat developed during braking.

The first component 30 comprises a plurality of first connection portions 34 that extend from the braking track 32 towards the inside (i.e. towards the axis X of the brake disc 10). The first connection portions 34 comprise respective first connection areas 36 at which the first component 30 is connected to the second component 40. The first connection portions 34 are equally circumferentially spaced and, in the example illustrated in FIGS. 1-7 and 9, there are seven of them. In FIGS. 1-7 and 9, so as not to overcomplicate the graphical representation, the reference numerals are indicated only on some of the first connection portions 34, as well as only on some of other elements described hereinafter.

The first connection areas 36 are made at respective free end portions of the first connection portions 34.

In particular, each first connection portion 34 comprises a radially outer end 34a joined to the braking track 32 and a radially inner end 34b at the respective first connection area 36.

In the example illustrated in FIGS. 1-7 and 9, the first connection portions 34 comprise a respective pair of connector elements 35 that extend between the respective first connection area 36 and the braking track 32. The pair of connector elements 35 defines a through opening of elongated shape 37 between them.

The connector elements 35 have a slightly divergent or substantially parallel arrangement, from the respective first connection area 36 towards the braking track 32.

In the example illustrated in FIGS. 1-7 and 9, each connector element 35 has the same axial thickness.

The first connection portion 34 extends in a direction inclined with respect to a radial direction passing through the center of the radially inner annular portion 42 and through the radially inner end 34b. Such an inclination with respect to the radial direction is comprised in the range between 5° and 70°, including extreme values, preferably in the range between 30° and 60°, including extreme values, and more preferably in the range between 45° and 55°, including extreme values.

The braking track 32 comprises a plurality of through slits 32a, of elongated shape and inclined with respect to a direction of extension of a side edge 14a of the brake pads 14 (FIG. 6).

In other words, given that the side edge 14a of the brake pads 14 extends according to a direction substantially parallel to a radial direction that passes through the center of the brake pad 14 and through the center of the brake disc 10, the through slits 32a are substantially inclined with respect to such a radial direction.

The direction of the through slits 32a is defined as the direction along which an edge of such openings extends. Such an edge is preferably the edge of the through slit 32a which firstly comes into contact with the brake pad 14 during normal use of the bicycle.

In particular, the through slits 32a have an inclination, with respect to the direction of extension of the side edge 14a, comprised in the range between 5° and 60°, including extreme values, preferably in the range between 15° and 40° including extreme values, and more preferably said inclination is about 29°.

All of the through slits 32a have substantially the same inclination, or in any case an inclination comprised in the aforementioned ranges, including extreme values.

The number of through slits 32a is a multiple of the number of first connection portions 34. In particular, in the example illustrated in FIGS. 1-7 and 9, there are seven first connection portions 34 and there are forty-nine slits 32a.

The second component 40 comprises a plurality of second connection portions 44, in equal number to that of the plurality of first connection portions 34. The second connection portions 44 are equally circumferentially spaced. The second connection portions 44 extend outwards from the radially inner annular portion 42 towards the first component 30 and comprise respective second connection areas 46, at which the second component 40 is connected to the first component 30. In FIGS. 1-7 and 9, so as not the overcomplicate the graphical representation, the reference numerals are indicated only of some of the second connection portions 44, as well as only some of other elements described hereinafter.

The second connection areas 46 are made at respective free end portions of the second connection portions 44.

In particular, each second connection portion 44 comprises a radially outer end 44a at the respective second connection area 46 and a radially inner end 44b joined to the radially inner annular portion 42.

The second connection portions 44 comprise a respective pair of arms 45 that extend between the respective second connection area 46 and the radially inner annular portion 42. The pair of arms 45 defines a through opening 47 between them.

The pair of arms 45 has divergent arrangement from the respective second connection area 46 towards the radially inner annular portion 42. Such divergent arms 45 thus extend in different directions.

As illustrated in the attached figures, a first arm 45 of the pair of arms 45 has inclination, with respect to a radial direction passing through the center of the radially inner annular portion 42 and the second connection area 46, opposite to the inclination of the other divergent arm.

Preferably, the first divergent arm 45 is inclined with respect to the other divergent arm by an angle comprised between 15° and 90°, more preferably comprised between 20° and 60°, even more preferably comprised between 35° and 45°.

In the example illustrated in FIGS. 1-7 and 9, each arm 45 has the same axial thickness.

The divergent arms 45 have a non-rectilinear but arched extension.

The arched extension of the divergent arms 45 defines a concavity thereof so that a line passing through the end of an arm 45 constrained to the second connection area 46 and through the end of the same arm constrained to the radially inner annular portion 42 does not intercept portions of the arm comprised between the two ends.

As more clearly illustrated in FIG. 2, the concavity of both divergent arms 45 faces in the same direction.

Preferably, the concavity of an arm 45 directly faces the through opening 37 and the concavity of the arm 45, of the second connection portion 44, circumferentially preceding (in accordance with the direction of rotation of the brake disc) faces the opposite way with respect to the through opening 37.

The through opening 47 has rounded edges at joining areas of each arm 45 with the respective second connection area 46 and with the radially inner annular portion 42. In other words, each arm 45 is connected with the respective second connection area 46 and with the radially inner annular portion 42 without sharp edges, but with rounded edges.

Such rounded edges have radii of curvature comprised in the range between 1 mm and 6 mm, including extreme values, preferably in the range between 2 mm and 4 mm, including extreme values, and more preferably in the range between 2.5 mm and 3 mm, including extreme values. Such radii of curvature make it possible to have a homogeneous distribution of stresses between the divergent arms 45.

Each second connection portion 44 comprises a reinforcing arm 49 that extends from the second connection area 46 and reaches another second connection portion 44 that is located circumferentially adjacent to the aforementioned second connection portion 44.

In particular, each reinforcing arm 49 extends from the second connection area 46 and reaches an arm 45 of the other second connection portion 44 that is located circumferentially adjacent. In the example illustrated in FIGS. 1-7 and 9, the reinforcing arm 49 reaches the divergent arm 45 at or close to its radially outer end 44a.

Each reinforcing arm 49 of a second connection portion 44 has arrangement substantially parallel to that of the first connection portion 34 of the first component 30.

In the example illustrated in FIGS. 1-7 and 9, the reinforcing arms 49 have lower axial thickness than that of the arms 45.

Figure 7:
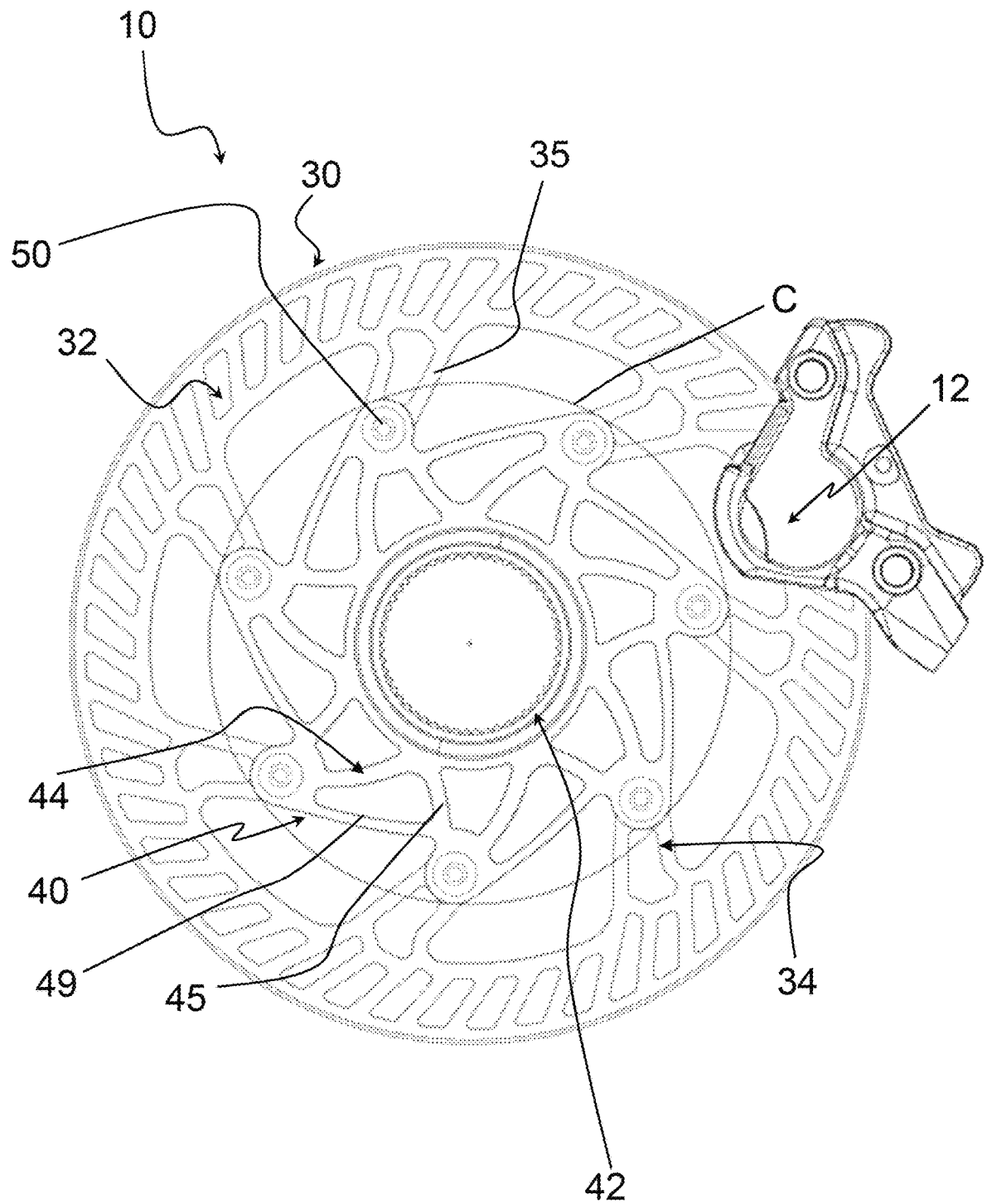
FIG. 7 is a rear view of the brake disc of FIG. 1, in which a caliper of a disc brake has been added.

As shown in FIG. 7, the maximum outer diameter of the second component 40 is within a circumference C that does not interfere with the caliper 12.

In other words, the maximum outer diameter of the second component 40 is smaller than the inner diameter of the braking track 32.

The connection between the second connection portions 44 of the second component 40 and the corresponding first connection portions 34 of the first component 30, and in particular the connection between the second connection areas 46 and the corresponding first connection areas 36, takes place through connecting members 50.

Such a connecting member 50 is preferably a rivet 52. The rivet 52 is perforated and is received in respective through holes 36c, 46c formed in the first and second connection area 36, 46. Moreover, the rivet 52 is mounted with axis substantially parallel to the axis X and is caulked. The caulking 52a of the rivet 52 is carried out on the first connection area 36, whereas the shoulder 52b of the rivet 52 rests on the second connection area 46.

The transfer of the braking force takes place through the rivets 52 that work cutting through the contact surface between the first and second connection area 36, 46. The lateral stresses on the brake disc 10 are discharged onto the contact surface between the first and second connection area 36, 46.

Figure 4:
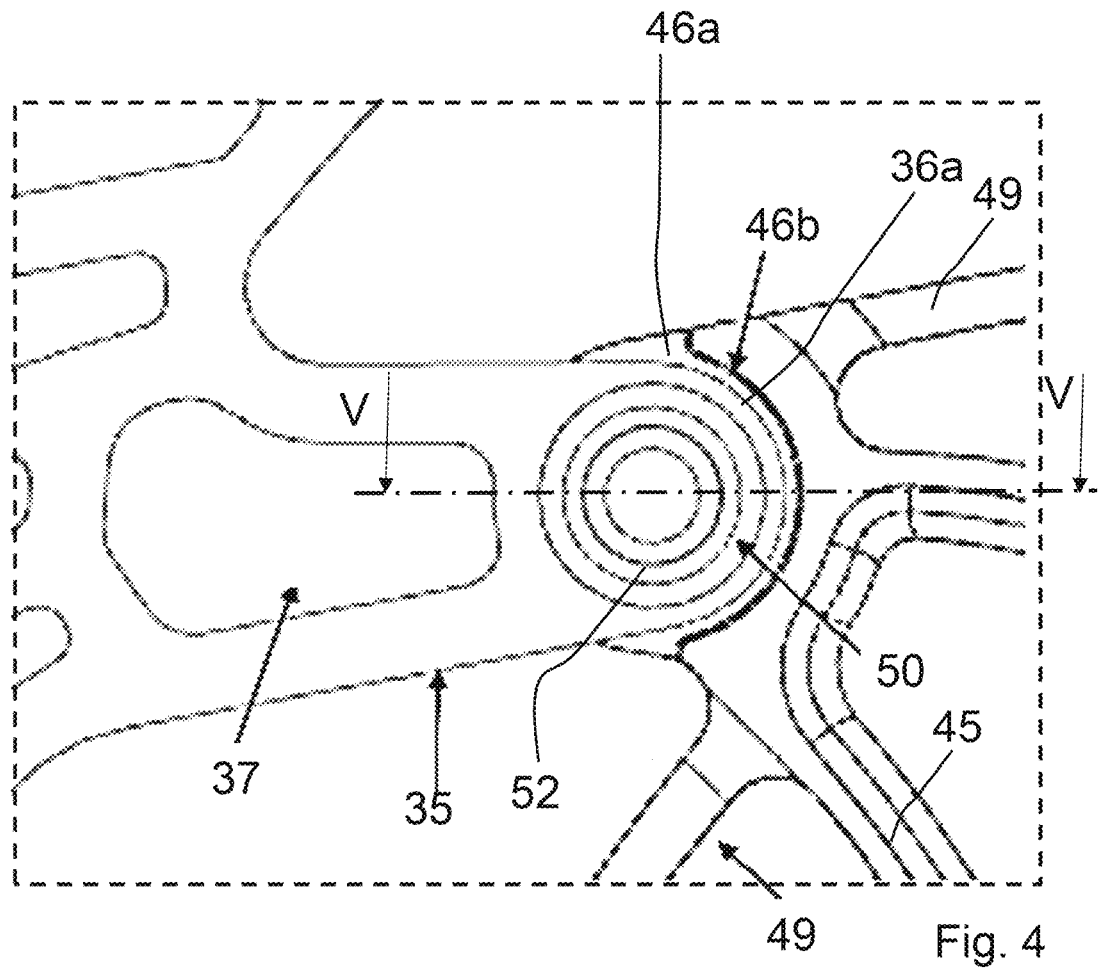
FIG. 4 is an enlarged view of a portion of the brake disc of FIG. 2, such a portion being defined by the dashed rectangle of FIG. 2.
Figure 5:
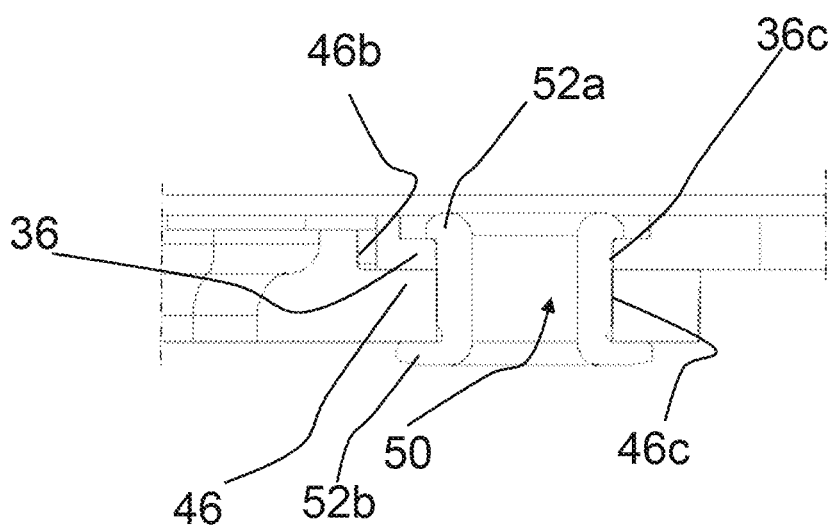
FIG. 5 is a section view, in enlarged scale, of the brake disc of FIG. 4, taken according to the plane V-V of FIG. 4.

As illustrated in FIGS. 4 and 5, the first connection area 36 axially overlaps the corresponding second connection area 46 and is housed in a recess 46a of the second connection area 46.

As illustrated in FIGS. 4 and 5, the first connection area 36 is not radially in contact with the second connection area 46. In other words, a space is provided in the radial direction between side wall 46b of the recess 46a of the second connection area 46 and side wall 36a of the first connection area 36. The side wall 46b and the side wall 36a are arranged substantially parallel to the axis X.

The connecting members 50 are equally spaced apart by a distance L (FIG. 9) comprised in the range between 10 mm and 80 mm, including extreme values, preferably in the range between 20 mm and 50 mm, including extreme values, and more preferably in the range between 35 mm and 40 mm, including extreme values.

Figure 8:
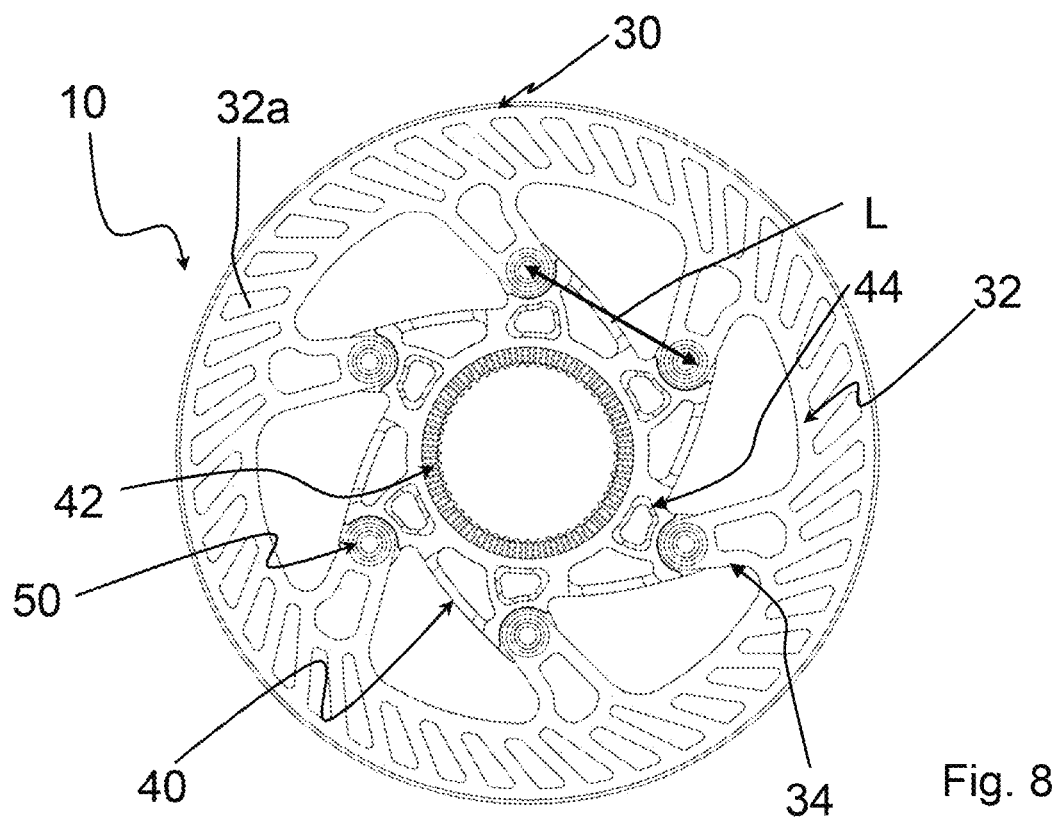
FIG. 8 is a front view of a second embodiment of the brake disc for a bicycle according to the present invention.

FIG. 8 shows a second preferred embodiment of a brake disc for a bicycle in accordance with the present invention, wholly indicated with 10.

In such a FIG. 8, elements that are analogous or functionally corresponding to those described above with reference to the first embodiment illustrated in FIGS. 1-7 and 9 are indicated with the same reference numeral and for their detailed description reference should be made to what has been outlined above.

Figure 9:
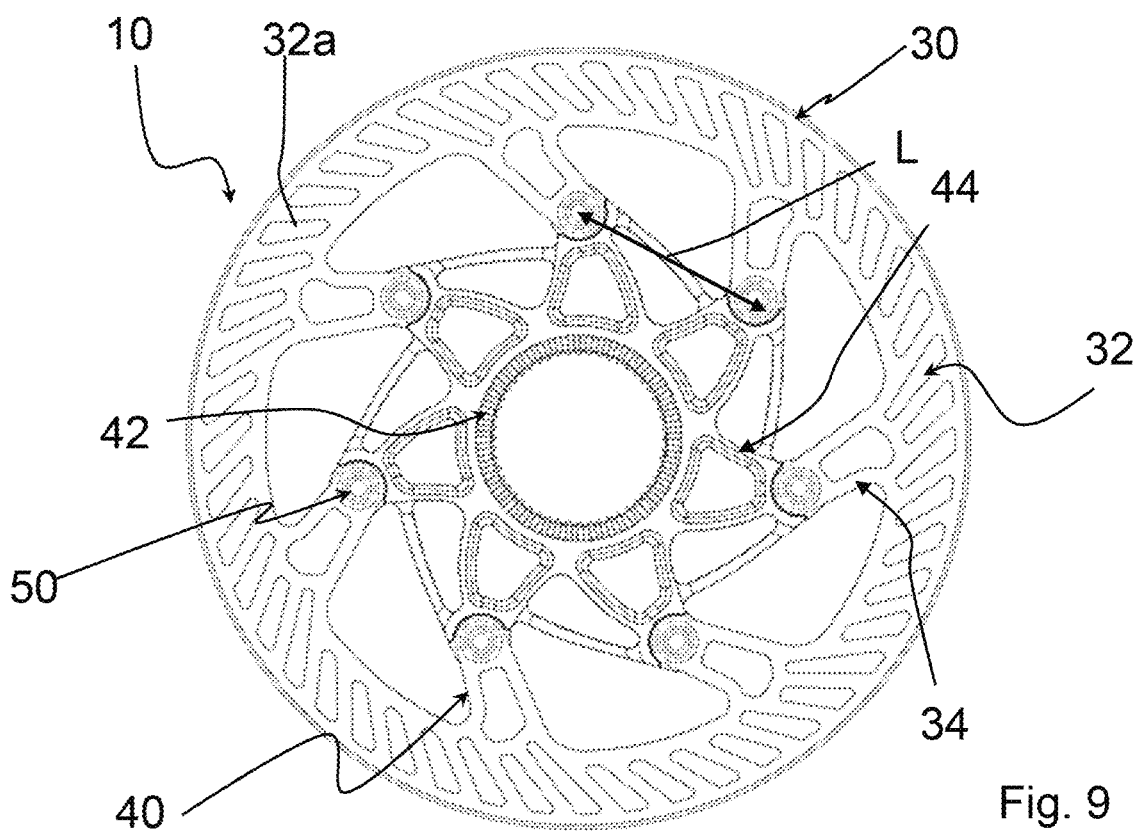
FIG. 9 is a front view of the brake disc of FIG. 1, totally analogous to FIG. 2, but having substantially the same scale as FIG. 8.

The second embodiment of the brake disc 10 illustrated in FIG. 8 differs from the one illustrated in FIGS. 1-7 and 9 substantially in that the brake disc 10 has a smaller outer diameter than that of the brake disc 10 illustrated in FIGS. 1-7 and 9, as can be clearly seen from the visual comparison of FIGS. 8 and 9.

For example, the brake disc 10 of FIG. 8 has an outer diameter equal to 140 mm, whereas the brake disc 10 of FIG. 9 has an outer diameter equal to 160 mm.

The distance L between the connecting members 50 of the brake disc 10 of FIG. 8 is substantially unchanged with respect to that of the brake disc 10 of FIG. 9.

In order to obtain this, the number of connecting members 50 of the brake disc 10 of FIG. 8, i.e. the number of first and second connection portions 34 and 44, is less than that of the brake disc 10 of FIG. 9. In particular, there are six connecting members 50 of the brake disc 10 of FIG. 8, instead of the seven connecting members 50 of the brake disc 10 of FIG. 9.

There are six first and second connection portions 34 and 44 of the brake disc 10 of FIG. 8 and there are forty-two through slits 32a.

Figure 10:
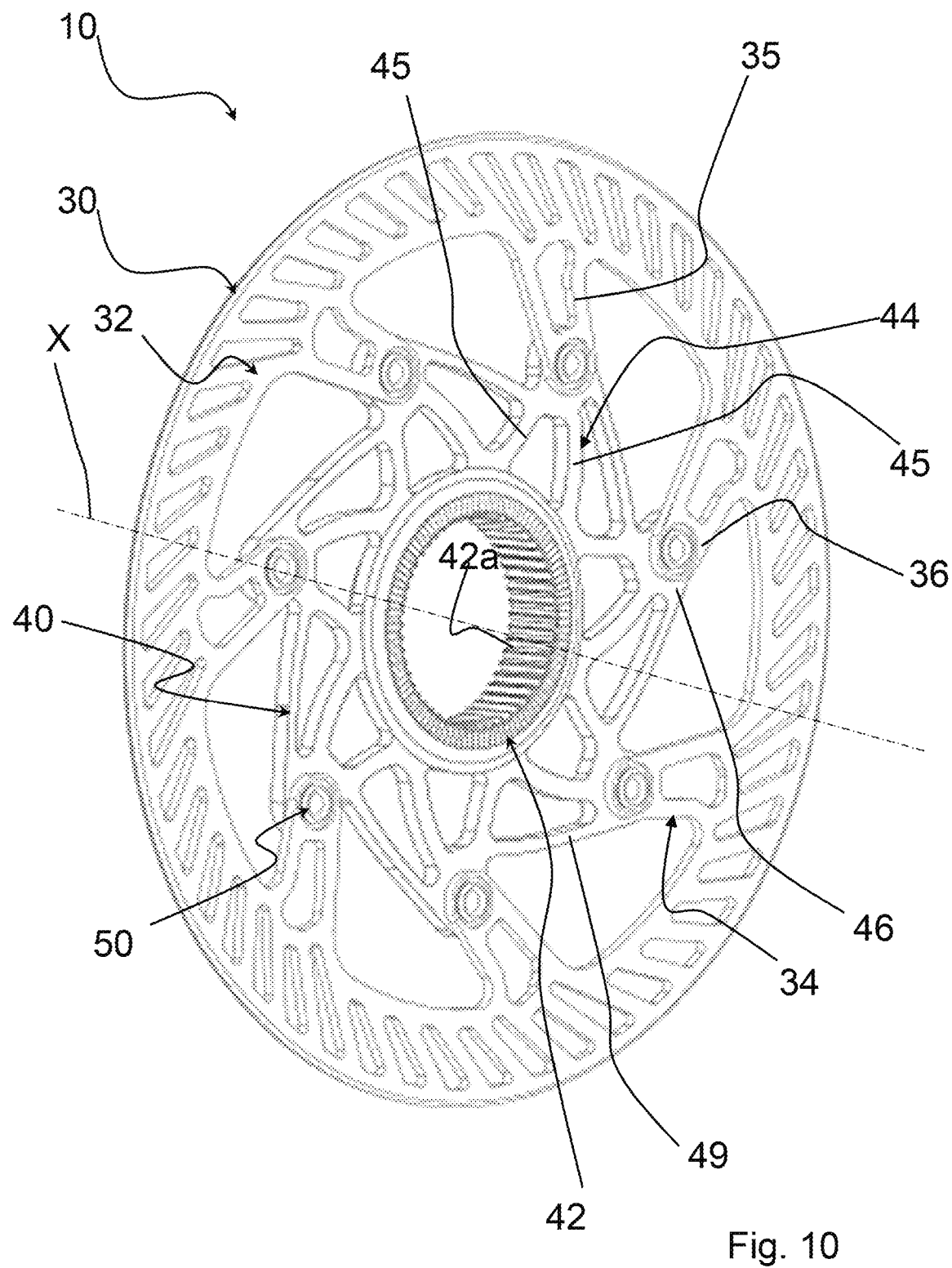
FIG. 10 is a perspective view of a third embodiment of a brake disc for a bicycle according to the present invention.
Figure 11:
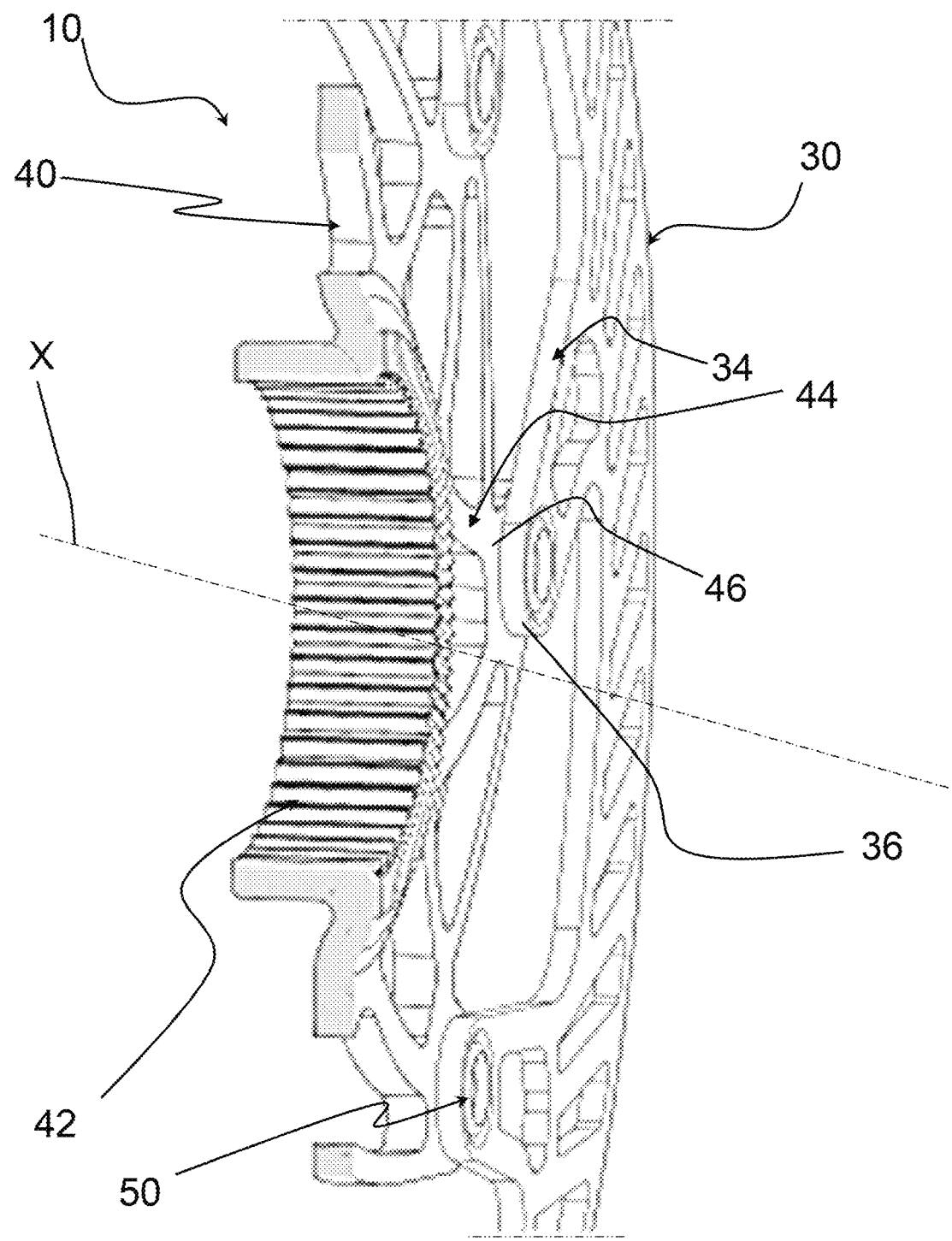
FIG. 11 is a section view, in enlarged scale, of a portion of the brake disc of FIG. 10.
Figure 12:
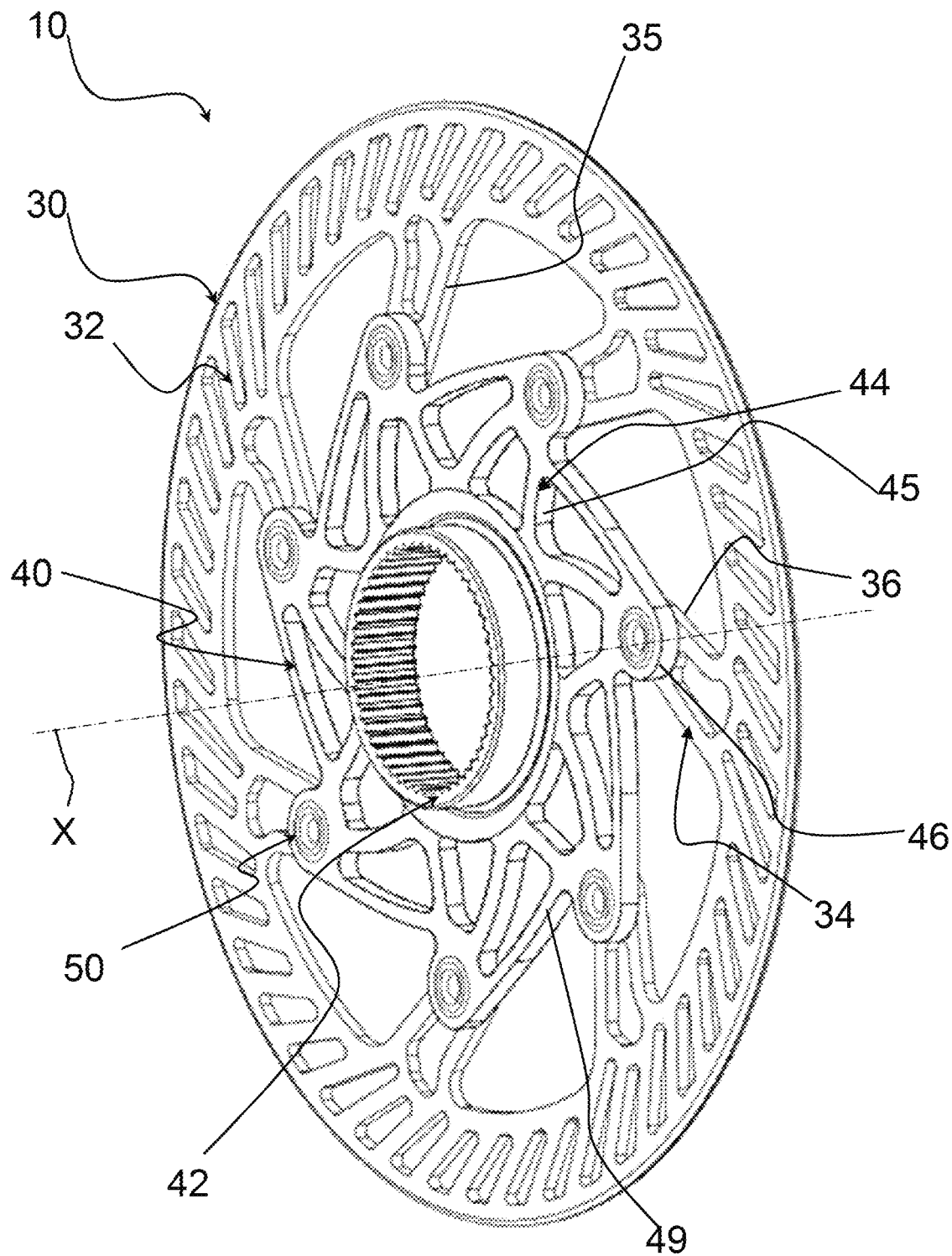
FIG. 12 is a perspective view of the brake disc of FIG. 10, taken from the opposite side with respect to FIG. 10.

FIGS. 10-12 show a third preferred embodiment of a brake disc for a bicycle in accordance with the present invention, wholly indicated with 10.

In such FIGS. 10-12, elements that are analogous or functionally corresponding to those described above with reference to the first embodiment illustrated in FIGS. 1-7 and 9 are indicated with the same reference numeral and for their detailed description reference should be made to what is outlined above.

The third embodiment of the brake disc 10 illustrated in FIGS. 10-12 differs from that illustrated in FIGS. 1-7 and 9 substantially in that the second connection areas 46 of the brake disc 10 are not provided with the recesses 46a foreseen in the second connection areas 46 of the brake disc 10 of FIGS. 1-7 and 9. The first connection areas 36 axially overlap the corresponding second connection areas 46, as illustrated in FIGS. 10-12.

In this case, the second component 40 can be made of punched sheet steel, composite material or plastic material.

In particular, the second component 40 can be made of steel and the forming takes place with successive molding operations.

The second component 40 of the brake disc 10 of FIGS. 1-9 is generally made of forged aluminum (or alloys thereof) and then machined.

Of course, those skilled in the art can bring numerous modifications and variants to the brake disc for a bicycle of the present invention, in order to satisfy specific and contingent requirements, all of which are in any case covered by the scope of protection defined by the following claims.

What is claimed is:

1. A brake disc for a bicycle comprising:
a first component having a braking track configured to cooperate with brake pads and a plurality of first connection portions that extend towards the inside and that comprise respective first connection areas;
a second component having (i) a radially inner annular coupling portion for coupling with a hub of a wheel of the bicycle and (ii) a plurality of second connection portions, in a number corresponding to said plurality of said first connection portions, the second connection portions extending outwards from the radially inner annular coupling portion towards said first component and comprising respective second connection areas; and
connecting members active between the first connection areas and the corresponding second connection areas;
wherein said second connection portions comprise at least one respective pair of arms that extend between the respective second connection areas and the radially inner annular coupling portion, said pair of arms defining a through opening between them,
wherein said first connection area axially overlaps the corresponding second connection area and is housed in a recess of the second connection area.

2. The brake disc according to claim 1, wherein said pair of arms has a divergent arrangement from the respective second connection area towards the radially inner annular coupling portion.

3. The brake disc according to claim 1, wherein each second connection portion comprises a reinforcing arm that extends from the respective second connection area and reaches another second connection portion that is arranged circumferentially adjacent to said another second connection portion.

4. The brake disc according to claim 3, wherein said reinforcing arm reaches an arm of said pair of arms of a subsequent second connection portion at or close to a radially outer end thereof.

5. The brake disc according to claim 1, wherein each first connection portion comprises a radially outer end joined to the braking track and a radially inner end at the respective first connection area, said first connection portion extending in an inclined direction with respect to a radial direction passing through the center of the radially inner annular coupling portion and through said radially inner end.

6. The brake disc according to claim 1, wherein each arm of said pair of arms has a same axial thickness.

7. The brake disc according to claim 3, wherein said reinforcing arm has a lower axial thickness than an axial thickness of said pair of arms.

8. The brake disc according to claim 1, wherein said connecting members comprise perforated rivets axially received in respective through holes defined in said first connection area and in said second connection area.

9. The brake disc according to claim 1 wherein said connecting members are equally spaced from one another by a distance (L) comprised in a range between 10 mm and 80 mm, including extreme values.

10. The brake disc according to claim 1, wherein said connecting members are equally spaced from one another by a distance (L) comprised in a range between 20 mm and 50 mm, including extreme values.

11. The brake disc according to claim 1, wherein said connecting members are equally spaced from one another by a distance (L) comprised in a range between 35 mm and 40 mm, including extreme values.

12. The brake disc according to claim 1, wherein said first connection area has exclusively axial contact with the second connection area.

13. The brake disc according to claim 1, wherein said braking track comprises a plurality of through slits, of elongated shape and inclined with respect to a direction of extension of a side edge of said brake pads.

14. The brake disc according to claim 13, wherein said through slits have an inclination, with respect to said direction of extension of said side edge of said brake pads, comprised in a range between 15° and 40° mm, including extreme values.

15. The brake disc according to claim 13, wherein said through slits have an inclination, with respect to said direction of extension of said side edge of said brake pads, of no more than 29°.

16. The brake disc according to claim 13, wherein the number of said through slits is a multiple of the number of first connection portions.

17. A brake disc for a bicycle comprising:
a first component having a braking track configured to cooperate with brake pads and a plurality of first connection portions that extend towards the inside and that comprise respective first connection areas;
a second component having (i) a radially inner annular coupling portion for coupling with a hub of a wheel of the bicycle and (ii) a plurality of second connection portions, in a number corresponding to said plurality of said first connection portions, the second connection portions extending outwards from the radially inner annular coupling portion towards said first component and comprising respective second connection areas; and
connecting members active between the first connection areas and the corresponding second connection areas;
wherein said second connection portions comprise at least one respective pair of arms that extend between the respective second connection areas and the radially inner annular coupling portion, said pair of arms defining a through opening between them,
wherein each second connection portion comprises a reinforcing arm that extends from the respective second connection area and reaches another second connection portion that is arranged circumferentially adjacent to said another second connection portion,
wherein each reinforcing arm of a respective second connection portion is substantially parallel to the first connection portion of said first component with which the second connection portion of the second component is associated.

18. A brake disc for a bicycle comprising:
a first component having a braking track configured to cooperate with brake pads and a plurality of first connection portions that extend towards the inside and that comprise respective first connection areas;
a second component having (i) a radially inner annular coupling portion for coupling with a hub of a wheel of the bicycle and (ii) a plurality of second connection portions, in a number corresponding to said plurality of said first connection portions, the second connection portions extending outwards from the radially inner annular coupling portion towards said first component and comprising respective second connection areas; and
connecting members active between the first connection areas and the corresponding second connection areas;
wherein said second connection portions comprise at least one respective pair of arms that extend between the respective second connection areas and the radially inner annular coupling portion, said pair of arms defining a through opening between them,
said braking track comprises a plurality of through slits, of elongated shape and inclined with respect to a direction of extension of a side edge of said brake pads,
wherein said plurality of through slits have an inclination, with respect to said direction of extension of said side edge of said brake pads, comprised in a range between 5° and 60° mm, including extreme values.

19. The brake disc according to claim 18, wherein said first connection area axially overlaps the corresponding second connection area and is housed in a recess of the second connection area.

* * * * *